United States Patent [19]
Brown et al.

[11] 3,761,917
[45] Sept. 25, 1973

[54] GUN RUGGED RECORDER

[75] Inventors: Eugene A. Brown, East Northport; Robert L. Archer, Woodbury, both of N.Y.

[73] Assignee: The United States of America as represented by the Secretary of the Army, Washington, D.C.

[22] Filed: May 15, 1972

[21] Appl. No.: 253,044

[52] U.S. Cl. ........ 340/347 AD, 178/15, 235/92 AE, 346/38, 73/489
[51] Int. Cl. ... H03r 13/20, Ho4l 15/34, G01b 15/08
[58] Field of Search ................ 178/15; 340/166 EL, 340/347 AD; 346/38, 107 R, 74 P; 235/92 AE, 92 FQ; 73/518, 488, 489, 499

[56] References Cited
UNITED STATES PATENTS

| | | | |
|---|---|---|---|
| 3,501,586 | 3/1970 | Russell | 178/15 |
| 3,617,903 | 11/1971 | Trolio et al. | 178/15 |
| 3,432,687 | 3/1969 | Emmer | 340/347 AD |
| 3,612,836 | 10/1971 | Jordan et al. | 235/92 FQ |

*Primary Examiner*—Thomas A. Robinson
*Attorney*—Harry M. Saragovitz et al.

[57] ABSTRACT

An on-board electronic system for providing and recording acceleration profile data during the firing and launch of an artillery projectile, wherein the system comprises: means for sensing acceleration; means for taking time-window samples of the data generated by said acceleration sensing means, said time-window samples each having a duration proportional to the magnitude of the acceleration data received during the sample; means for converting the data contained within the time-window samples into digital form; a matrix of current sensitive, light emissive pulsers; means for encoding the digital data onto said pulser matrix; and high-speed photographic film placed in close proximity to said pulser matrix, wherein said film serves as a recording medium for the information contained in said matrix.

10 Claims, 3 Drawing Figures

GUN RUGGED RECORDER

The invention described herein may be manufactured, used, sold and licensed by or for the Government of the United States for governmental purposes without the payment to us of any royalty thereon. Title has passed to the United States as represented by the Secretary of the Army, through a mesne assignment from the Fairchild Camera and Instrument Corporation.

BACKGROUND OF THE INVENTION

A requisite to the proper design of an artillery projectile of any type is that the designer be totally apprised of the barrel environment in which the shell must operate. During the period of launch, while the shell is in the muzzle, it is exposed to extremes of shock acceleration and temperature. These extremes are experienced over a period of less than 50 milliseconds. Accordingly, it is clear that criteria for design specifications of almost any class of projectile cannot be formulated without access to complete and accurate data as to the parameters existent within the muzzle during the critical 50 millisecond launch period.

Early attempts at obtaining the desired data consisted principally of inserting sensors inside of the shell, and then attempting to transmit the data outside of the muzzle. This approach proved inadequate because of the fact that the muzzle tended to act as an electromagnetic shield, hence rendering any reception of data most difficult as well as unreliable. The present invention addresses itself to this fundamental problem of data acquisition while the shell is within the muzzle of the gun.

SUMMARY OF THE INVENTION

It is an object of the present invention to provide a data recording means, suitable for the recording of shock acceleration and temperature experienced by a projectile while within the muzzle of an artillery piece.

It is another object to obtain a linear time recording of the parameters experienced by a shell during its launch period.

The present invention developed from the empirically established premise that any significant acquisition of data from the projectile while in-muzzle can be obtained only by means of a recording system placed within the projectile itself. As the shell is fired, necessary data is recorded by various electronic means. The data is then examined upon recovery of the shell. It is apparent that any such an electronic system must possess a high degree of ruggedness and durability. These characteristics are obtainable through the use of state of the art solid state components. Such solid state components have been shown to be sufficiently insensitive to shock acceleration and temperature in order to operate in the environment of interest (30,000 g's at 160° F).

The present invention comprises an on-board electronic system for providing and recording acceleration profile data during the firing and launch of an artillery projectile. The system comprises: means for sensing acceleration; means for taking time-window samples of the data generated by said acceleration sensing means, said time-window samples each having a duration proportional to the magnitude of the acceleration data received during the sample; means for converting the data contained within the time-window samples into digital form; a matrix of current-sensitive, light emissive pulsers; means for encoding the digital data onto said pulser matrix; and high-speed photographic film placed in close proximity to said pulser matrix, wherein said film serves as a recording medium for the information contained in said matrix.

DETAILED DESCRIPTION OF THE INVENTION

Figure 1:
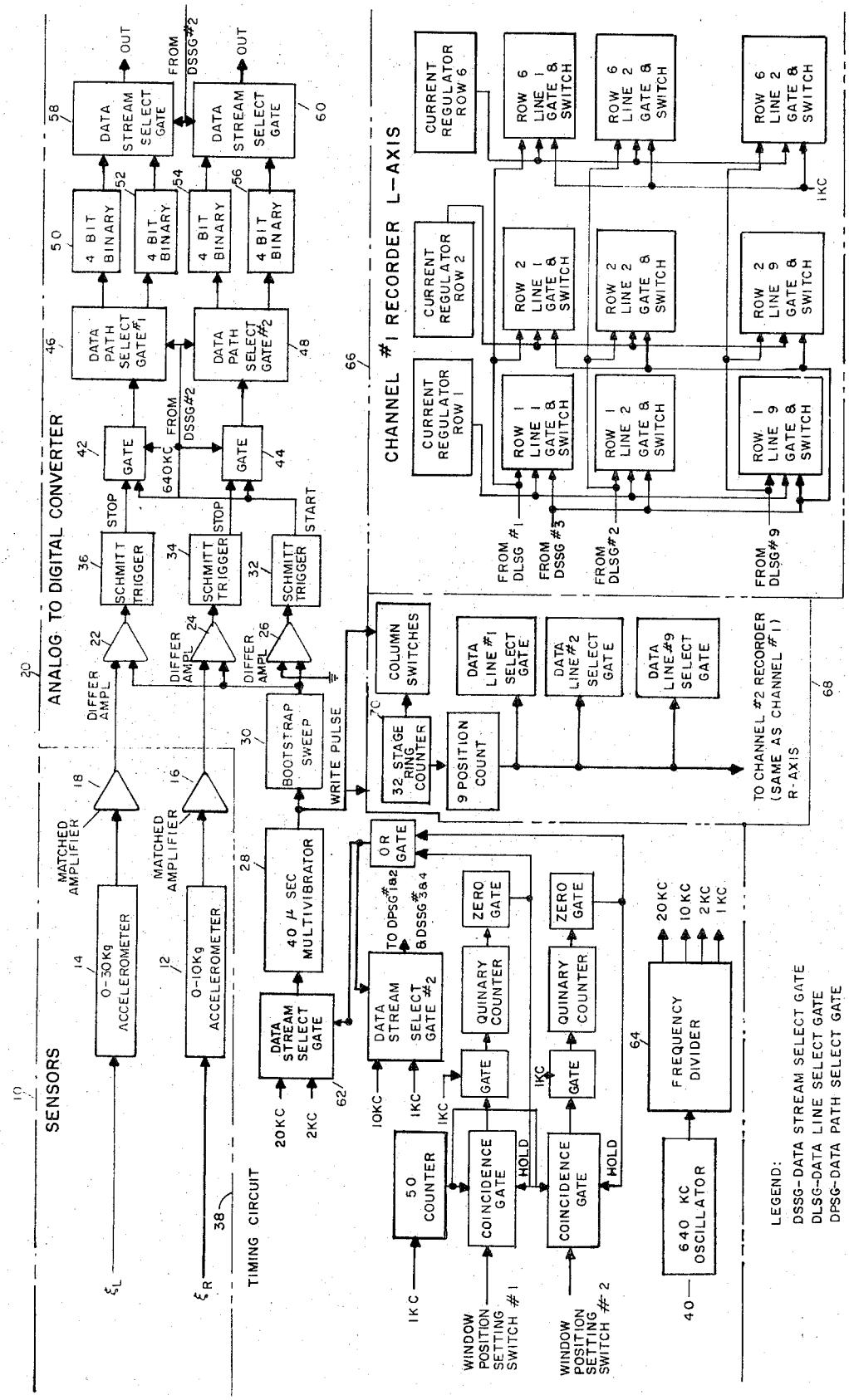
FIG. 1 is a block diagram of the circuitry of one embodiment of the present invention.

FIG. 1 illustrates a sensing subsystem 10. This subsystem comprises two accelerometers 12 and 14. These accelerometers may be piezoelectric accelerometers. Accelerometer 12 measures radial acceleration, while accelerometer 14 measures longitudinal acceleration. Each accelerometer is connected to a matched amplifier, accelerometer 12 being connected to amplifier 16, and accelerometer 14 being connected to matched amplifier 18.

The upper right side of FIG. 1 illustrates an analog to digital conversion subsystem 20. Within the subsystem 20 are three differential amplifiers 22, 24 and 26. These amplifiers modulate a sampling window which is created as follows: The sampling windows are generated by a 40 microsecond multi-vibrator 28. Superimposed upon this window train is a bootstrap sweep 30. The saw-tooth wave is fed into the differential amplifier 26 which is grounded at zero voltage. Preceding each saw-tooth wave into the amplifier 26 is a start pulse from Schmitt trigger 32 which initiates a given sampling pulse window. This window is fed into all three differential amplifiers 22, 24 and 26. Amplifiers 22 and 24 also receive data from the matched amplifiers 16 and 18. As long as data received from said amplifiers exceeds the voltage level of the bootstrap sweep, the sample window will continue, up until a maximum possible duration of 40 microseconds. However, should the voltage level of the incoming data from the matched amplifiers 16 and 18 fall beneath the voltage level of the bootstrap sweep, a stop pulse will be generated by the corresponding Schmitt trigger 34 or 36 respectively. For example, should the data from the longitudinal accelerometer 14 fall beneath the level of the bootstrap sweep 30, Schmitt trigger 36 will generate a stop pulse, hence terminating that particular sample window. Simultaneously, Schmitt trigger 34 is receiving data on radial acceleration through the differential amplifier 24. Should the voltage level of this data fall beneath the level of the bootstrap sweep 30, then Schmitt trigger 34 will generate a stop signal, hence terminating that sample window. In brief, it should be understood that we are detecting sample windows in two channels, the first measuring longitudinal acceleration, and the second measuring radial acceleration.

The 40 microsecond maximum duration of each sample window constitutes only a tiny segment of the total measured period of 50 milliseconds. Therefore, during the period of launch it can be assumed that the acceleration level existent within any given 40 microsecond window is relatively constant, and that hence, the duration of the window (which may range from zero up to 40 microseconds), is proportional to the G-force experienced during the time of each sample window.

In the lower left of FIG. 1 there is a timing circuit subsystem 38. Within this subsystem is a 640 KHz oscillator 40. The 640 KHz output of this oscillator is fed directly into the sampling windows of the two channels. The 640 KHz, which comprises pulses of approximately 1½ microseconds each, is fed into the sampling windows at gates 42 and 44. By filling the sampling windows with these high-frequency pulses and subsequently measuring the number of pulses within each sampling window, a conversion from the analog output of the amplifiers 22 and 24 into a digital output is achieved. This digital output is measured by the logic illustrated at the right side of the analog to digital conversion subsystem 20.

The high frequency digital pulses are then treated as follows: Data path select gates 46 and 48 alternate between the storage of data from the gates 42 and 44 and the recording of said data. Four four-bit binary counters 50, 52, 54 and 56 work in conjunction with said data path select gates 46 and 48. For example, gate 50 will store data while 52 is recording. While 52 stores, 50 will record, each working in complementary relationship with each other. In like manner, in the second channel while the binary 54 is storing data, the binary 56 will record, and vice versa. Finally, the stored data is fed out by the four binary counters into data stream select gates 58 and 60. Data is briefly stored therein for subsequent transmission as will be below described.

Within the timing circuit subsystem 38 is a data stream select gate 62. This gate 62 imparts to the total system the capability of sampling data both at a higher speed, i.e., at 20 KHz, and at a lower speed, i.e., at 2 KHz, during the 50 millisecond period during which launch occurs. The two recording speeds dictate the speed at which the sampling windows will appear on the radial and longitudinal data channels. High speed sampling occurs during two 5-millisecond periods. One hundred samples are taken during each of these periods. It is a notable feature of the present invention that the location, that is, the point in time at which each of these 5 millisecond windows can be taken, is adjustable. In other words, these two, 5-millisecond windows may be taken at any point within the 50 millisecond recording period.

Complementary to said sampling mode is the lower speed sampling at 2 KHz. The complementary operation occurs as follows: Whenever the system is not in the faster mode, it automatically shifts to the slower speed. In this slower sampling mode, a total of 80 samples are taken over a 40 millisecond period. That is, the low speed sampling occurs for 40 milliseconds while the high speed sampling occurs during two 5-millisecond periods for a total of 10 milliseconds.

With 200 sampling windows taken at high speed and 80 sampling windows taken at the lower speed, the recorder will examine a total of 280 sample windows. Within each of the 280 sample windows, the number (which may vary from zero to 16) of 640 KHz pulses appearing within each window will be counted, hence giving us a total of output pulses that is directly proportional to the acceleration experienced by the projectile during each of the 280 sample windows.

The timing circuitry illustrated in block diagram form in the subsystem 38 represents conventional timing circuitry whose purpose is simply to assure that the correct high speed and low speed sampling periods occur. Out of the 640 Kc oscillator, a frequency divider 64 is used to produce the other frequencies, namely, 1, 2, 10 and 20 KHz, which are used by the system.

Figure 2:
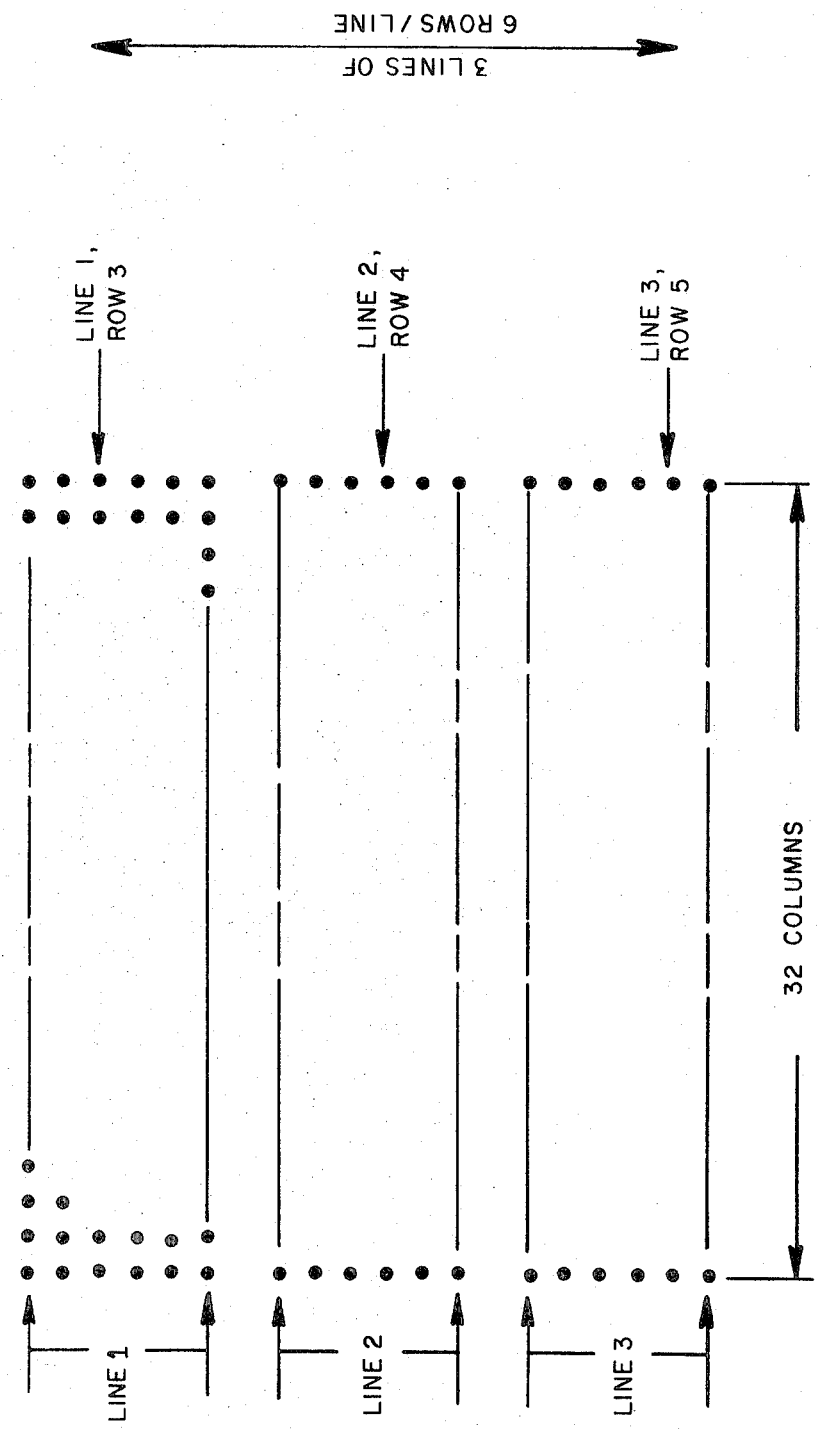
FIG. 2 illustrates one array of silicon light pulsers (SLP's).

The remaining two subsystems 66 and 68 of the system are both recording subsystems. Subsystem 66 records the output bits from the channel reading the forces on the longitudinal axis while the sybsystem 68 records the radial forces experienced by the projectile. Each of the recording channels L and R consist, in the present embodiment, of three arrays of silicon light pulsers (SLP's) per channel. FIG. 2 illustrates one such array. It is seen that each array consists of three lines and that within each line there are six rows. The top row represents the most significant bit (MSB) while the fourth row represents the least significant bit (LSB). The fifth row is not used in the present embodiment, while the sixth row is a time row, marking the time sequence for each bit of information as it is fed into an SLP. The information is transmitted from the data stream select gates 58 and 60 into a 32-stage ring counter 70. The counter encodes the information into column switches which place the data into the proper columns. (Note that there are 32 columns in each line). After line 1 is filled up, the ring counter will begin placing information into line 2. After line 2 is complete, information will be placed into line 3.

Inasmuch as each channel consists of three arrays and there are three lines per channel, there is a total of nine lines per channel. The circuitry illustrated in condensed form in subsystems 66 and 68 represents conventional solid state matrixing techniques that are well known in the computer art.

Figure 3:
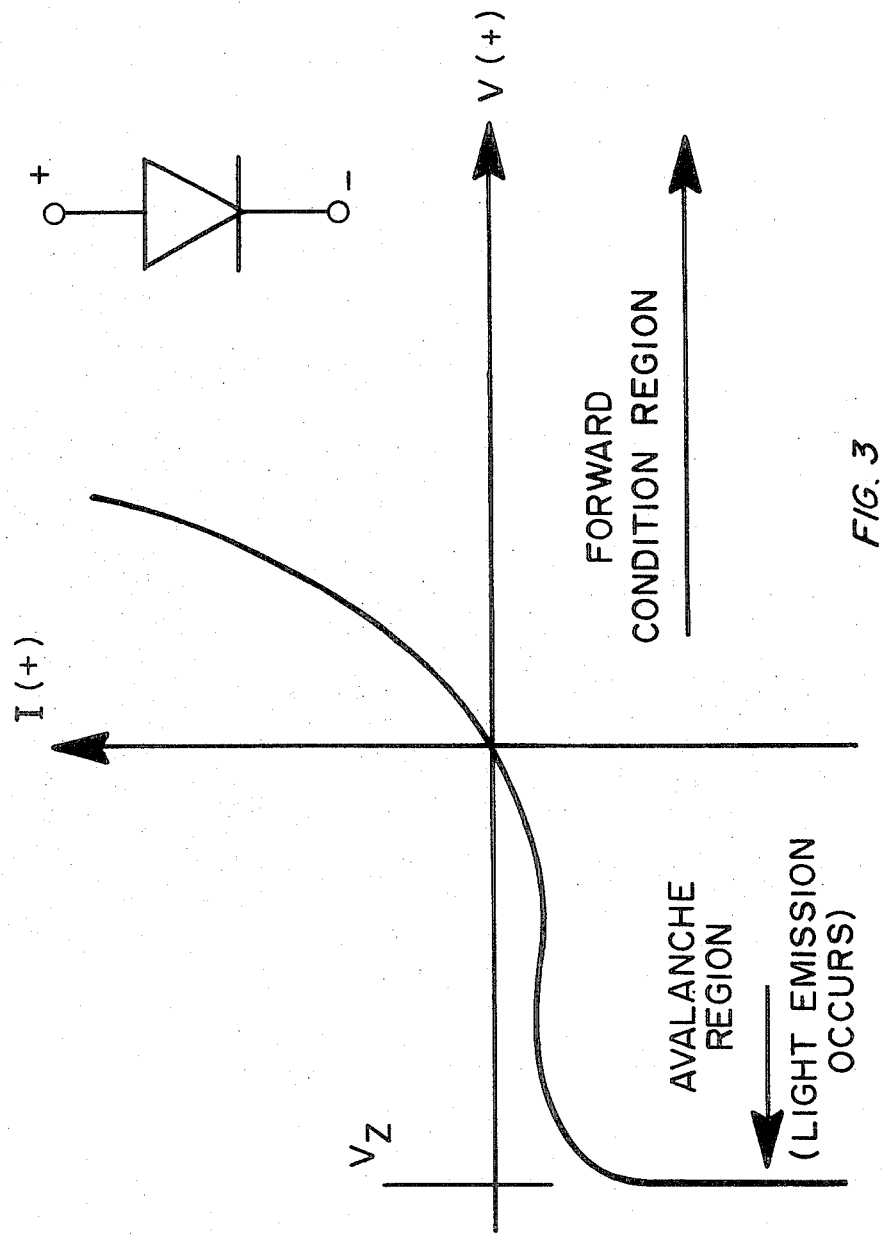
FIG. 3 illustrates the I-V characteristic of an SLP.

FIG. 3 illustrates the current-volt characteristic of the SLP's onto which the bit data is matrixed. Upon exposure of an SLP to a sufficient level $V_z$ of negative voltage, Zener breakdown occurs with a resultant light emission ocurring. This light emission is utilized for recording purposes. In abutting relationship to each of the 18 × 32 SLP components is placed suitable photographic film. Every dot that appears on the film corresponds to the location of an SLP matrix element that has been activated by a data bit.

The SLP is especially appropriate for the present application. It is highly linear, small, rigid, insensitive to shock, fast, and operates at low power. Tests have shown that 50 milliamps over 40 microseconds can produce a readable dot on Tri-X film. In addition, the component is highly reliable with a possible $3 \times 10^6$ hours of usage. This device is produced by the usual planer-type technique used with transistors, and yields a highly, uniform product. Its application and use are based on the accepted principle that the introduction of electrical energy into a silicon diode will result in the emission of light energy. A suitable silicon light pulser is produced by the Fairchild Camera & Instrument Corporation. This component consists of a p-n junction having two output terminals — an anode and a cathode. The voltage-current characteristics are similar to a standard silicon planer diode: it has a high conduction forward voltage region and a low conduction reverse voltage region. It is in these two areas that a normal diode would be operated. If voltage is applied in the reverse voltage region that is greater than the reverse rating, all such diodes will exhibit a high conductance range called the avalanche region. The silicon light pulser operates in this back-biased avalanche region.

In order to maximize the amount of light emission from the diode, the geometry and the dopant concentration are slightly altered: the junction consists of a circle whose diameter is about two thousandths of an inch. Application of suitable current (50 ma) causes light to be emitted around the perimeter of the junction. Hence the light source can be described as a thin, annular ring. The transmission of the light from this source leads to the formation of a dense, uniform 10 mil dot on a film emulsion located in a plane parallel to, and approximately 6 mils distant from, the plane of the junction.

Such SLP's are fabricated in arrayed bits of 18 × 32. Such an array is suitable to the present application. The light output of the SLP is broad band and spans the spectrum from the yellow region up into the red. The spectral content is relatively constant from 550 Angstrom units up to 7,000 Angstroms.

It is thus seen that the objects described in the Summary of the Invention are efficiently attained by the device of the above-described invention.

We wish it to be understood that we do not wish to be limited to the exact detail of construction shown for obvious modification will occur to persons skilled in the art.

We claim:

1. An on-board electronic system for providing and recording acceleration profile data during the firing and launch of an artillery projectile, wherein the system comprises:
   means for sensing a plurality of accelerations;
   means for taking time-window samples of the data generated by each of said acceleration sensing means, said time-window samples each having a duration proportional to the magnitude of the acceleration data received during the time-window sample;
   means for converting the data contained within the time-window samples into digital form;
   a matrix of current-sensitive, light-emissive pulsers; and
   means for encoding the digital data onto said pulser matrix.

2. The system as recited in claim 1 in which said system further includes a recording means placed proximate to said pulser matrix, wherein said recording means stores the information contained in said matrix.

3. The system as recited in claim 2 in which said recording means comprises photographic film.

4. The combination as recited in claim 2 in which said acceleration sensing means includes:
   an accelerometer for sensing radial acceleration; and
   an accelerometer for sensing longitudinal acceleration.

5. The combination as recited in claim 4 in which said time-window sampling means includes means for sampling acceleration data at selectably different rates within the duration of the launch period.

6. The combination as recited in claim 5 in which said digital conversion means includes:
   a pulse generator having its output fed into each time-window sample;
   means for counting the pulse content of each time-window; and
   binary means for relaying the digital bit level output of said counting means.

7. The combination as recited in claim 6 in which said pulser matrix comprises two recording channels, one for recording radial acceleration data, another for recording longitudinal acceleration data.

8. The combination as recited in claim 7 in which said encoding means emplaces its output bits into a row and column configuration on said matrix, the configuration having a row relationship to bit significance, and a column relationship to time sequence.

9. The combination as recited in claim 8, said combination also including a timing circuit for regulating the time duration of the selective sampling rates.

10. The combination as recited in claim 9 in which said pulser matrix comprises a multiplicity of silicon light diodes.

* * * * *